United States Patent [19]

Haley et al.

[11] 3,733,438

[45] May 15, 1973

[54] CARRIER SUPPLY FOR FREQUENCY DIVISION MULTIPLEXED SYSTEMS

[75] Inventors: Thomas John Haley, Summit, N.J.; Thomas Bennett Merrick, Plaistow, N.H.; James Sayre Ronne, Groveland, Mass.

[73] Assignee: Bell Telephone Laboratories, Incorportated, Murray Hill, N.J.

[22] Filed: Mar. 1, 1971

[21] Appl. No.: 119,750

[52] U.S. Cl. ....................179/15 FD
[51] Int. Cl. ....................H04j 1/06
[58] Field of Search ..........179/15 FD, 15 FS, 179/15 BP; 325/153, 184; 331/38, 41; 332/22

[56] References Cited

UNITED STATES PATENTS

| | | | |
|---|---|---|---|
| 3,555,426 | 1/1971 | Rogers | 325/184 |
| 2,849,605 | 8/1958 | Fickett | 179/15 FS |
| 2,445,664 | 7/1948 | Doelnz | 331/38 |
| 3,049,674 | 8/1962 | Stone | 331/41 |
| 2,602,159 | 7/1952 | Wirkler | 332/22 |
| 3,176,226 | 3/1965 | Berger | 179/15 BP |

*Primary Examiner*—Kathleen H. Claffy
*Assistant Examiner*—David L. Stewart
*Attorney*—E. W. Jr. and W. L. Keefauver

[57] ABSTRACT

The terminals in the frequency division multiplexed systems of the prior art employ many steps of modulation whose frequency variations, due to changes in the frequencies generated by the carrier oscillators, add to produce a frequency offset which is unacceptable in modern wideband systems. The terminals of the present invention use additional modulators connected to the carrier oscillators to reduce the frequency offset of the transmitted signal to the frequency variations of only a single oscillator.

12 Claims, 3 Drawing Figures

INVENTORS T. J. HALEY
T. B. MERRICK
J. S. RONNE
BY
ATTORNEY

CARRIER SUPPLY FOR FREQUENCY DIVISION MULTIPLEXED SYSTEMS

BACKGROUND OF THE INVENTION

This invention relates to telephony transmission systems and, more particularly, to a carrier supply for a frequency division multiplexed system.

In modern telephony frequency division multiplex systems, the final step of the modulation process occurs when the message channels are modulated at relatively high frequencies for transmission over the selected medium. A simplified block diagram embodiment of the prior art circuitry used for this final step of modulation in a frequency division multiplexed system is shown in FIG. 1. In the transmitting terminal of FIG. 1, the input signal to the terminal, S, would pass through the input low-pass filter to the first stage of modulation where the input signal is modulated at the carrier frequency $f_1$. (For illustrative purposes, lower single sideband modulation is employed throughout FIG. 1 as can be seen from the designations thereon indicating the numerical value of the frequencies at various points.) The modulating frequency $f_1$ is supplied by an oscillator which inherently has a relatively small output frequency variation designated $\pm\Delta f_1$ in the drawing. The output of the first oscillator is then fed to an input of a summing network, the other input of which is connected to the output of the carrier oscillator connected to the first modulator. The combined output of the summing network is then fed to a second modulator which is connected to a second carrier oscillator having an output frequency $f_2$ and an inherent output frequency variation designated as $\pm\Delta f_2$. The output carrier pilot frequency of this second stage of modulation is nominally the numerical difference of the frequency of the second oscillator and the first oscillator as indicated on the drawing. For example, if $f_1$ were chosen to nominally be 5.622 mHz and $f_2$ as nominally 11.8 mHz then the carrier pilot frequency would nominally be $11.8 - 5.622 = 6.178$ mHz. This difference frequency is then transmitted through a bandpass filter along with the modulated input signal, S, and combined with other channels for transmission over a medium, such as a coaxial cable, to a compatible demodulating terminal.

The typical prior art demodulator illustrated in FIG. 1 has an input bandpass filter which selects from a decombiner circuit the particular signal transmitted by the transmitter illustrated in FIG. 1. An oscillator connected to the first demodulator has an output frequency $f_2$, which is normally equal to the frequency $f_2$ in the transmitter, and a small output frequency variation designated as $\pm\Delta f_2$. (Although for purposes of continuity in the discussion the designation $\Delta f_2$ is used to represent the frequency variation of comparable oscillators in the transmitter and receiver, the output frequency variations of these oscillators would generally not be the same at any given instant of time.) The output of this first demodulator is then fed through a bandpass filter to a hybrid network and ultimately a second demodulator. A phase detector is normally connected to both the hybrid network to be responsive to the phase and frequency of the signal demodulated by the first demodulator and to a voltage controlled oscillator having an output frequency $f_1$ with an output variation $\pm\Delta f_1$. The phase detector and oscillator are interconnected in an automatic phase control (APC) loop to provide compensation for the phase and frequency variations in both transmitter oscillators and the oscillator connected to the first demodulator in the receiver, as well as the phase and frequency variations suffered during transmission over the transmission medium. The output of the second demodulator is fed through the low-pass filter to the following circuitry.

The frequency variation error or offset in a system such as that illustrated in FIG. 1 is thus the combination of the variations in both oscillators in the transmitter and the oscillator connected to the first demodulator in the receiver. The "worst case" frequency offset condition as indicated by the notations of FIG. 1 would then be the sum $(\Delta f_1+\Delta f_2+\Delta f_2)$ of the maximum variations of each of the noted oscillators. This relatively large frequency offset implies increased quadrature distortion and phase error, both of which result in signal degradation. As the frequency offset requirements of modern transmission systems with wider bandwidths become more and more stringent, it becomes increasingly difficult from a cost and reliability standpoint to design carrier supplies with the required frequency stability. For example, a typical frequency offset requirement for a modern analog transmission system having carrier frequencies of up to 70 mHz might be 2 Hz or less. For digital transmission in such a system, the frequency offset requirement is as near zero as practical.

The need for stable phase and frequency synchronized carrier supplies has thus grown considerably in recent years. In these supplies, carrier synchronization is often accomplished by locking the phase of the carrier frequency in the receiver to a synchronizing pilot that is transmitted along with the broadband signal. As illustrated in the prior art system of FIG. 1, an automatic phase control circuit using a voltage controlled oscillator is commonly employed for this purpose. The steady state phase error of the automatic phase control circuit, which as noted heretofore introduces signal degradation, is directly related to the magnitude of the frequency offset. As can be seen from the frequency notations of FIG. 1, the frequency offset of such prior art systems is relatively high. As also noted heretofore, the frequency offset is mainly due to the output frequency variations of the carrier oscillators.

In a system such as that of FIg. 1 several straightforward approaches may be taken to reduce the frequency offset and thereby minimize the signal degradation. For example, the oscillators may be crystal oscillators with only a minimal frequency variation; the gain of the automatic phase control loop could be increased to reduce the phase error; and two automatic phase control loops could be employed in the receiver, one for each demodulator. These procedures, however, have generally not reduced the frequency offset to levels sufficient for modern high frequency wideband systems. Expensive and complex crystal oscillators have been designed to reduce the frequency offset to less than 10 cycles, which is sufficient for the narrower band systems of the past but is unacceptable from a cost and design standpoint for modern systems. Use of two automatic phase control loops introduces difficult circuit design problems and, in all probability, resultant circuitry which is also complex and expensive, while increased loop gain to the necessary levels in a single automatic phase control loop introduces all the problems and errors incurred with high gain loops without obtaining the desired results for modern high frequency systems. Such automatic phase control loops are additionally difficult to design because of the wider frequency capture range these circuits must have for higher frequency offsets.

It is, therefore, an object of this invention to provide a wideband carrier system having a minimal transmitted frequency offset equivalent to that of only a single carrier oscillator.

It is another object of this invention to provide a modern wideband carrier system which may employ relatively simple oscillators and only a single, relatively low gain, automatic phase control loop.

SUMMARY OF THE INVENTION

The present invention reduces the frequency offset of the transmitted signal in a modern wideband carrier system to the frequency variation of a single oscillator in the transmitter. In accordance with the present invention, the input signal to the transmitting terminal is first modulated under the control of a first oscillator having an output frequency $f_1$, which may for purposes of comparison be the same value as that of the frequency $f_1$ of the prior art circuitry of FIG. 1. (For ready comparison with the prior art system of FIG. 1, the notations of FIG. 2 also relate to lower single sideband modulation.) The output of the first modulator is combined in a summing network with the output frequency $f_1$ of the first oscillator and fed to one input of a second modulator. A third modulator is connected both to the first oscillator and to a second oscillator having a nominal output frequency p which in terms of the designations used for the prior art system of FIG. 1 would be numerically equal to $f_2$–$f_1$; the nominal carrier pilot frequency of both the present and prior art systems. The frequency output of the third modulator fed to an input of the second modulator is thus $f_2$, a combination of the frequencies $f_1$ and $p$ and the variations of each of the oscillators. For lower single sideband modulation in the second modulator, the frequency $f_2$ would be numerically equal to the sum of the frequencies $f_1$ and $p$ and the frequency variations of both oscillators. The second stage of modulation thus has one input having the $\pm\Delta f_1$ variations of the first oscillator and a second input which also contains the $\pm\Delta f_1$ variations of the first oscillator in addition to the $\pm\Delta p$ variations of the second oscillator. In this second modulation stage, the $\pm\Delta f_1$ variations cancel and only the $\pm\Delta p$ variations appear in the transmitted output signal. The frequency offset of the transmitted signal is thus due only to the variations of a single oscillator and not to the variations of both oscillators, as in the prior art transmitter, for the same output frequencies and the same input signals, be they digital or analog. Since the oscillators of the system of the present invention therefore need not have the accuracy of the oscillators of the prior art system they may be less complex and hence less expensive. The first oscillator, which does not affect the frequency offset, need not possess any more than the normal accuracy of most commercially packaged oscillators.

The receiver of the transmission system of the present invention demodulates the signal, S, which is modulated in two steps in the transmitter. A carrier recovery circuit connected to the input of the receiver includes an automatic phase control loop comprising a phase detector and a voltage controlled first oscillator. The automatic phase control circuit recovers the carrier pilot signal with the output of the first oscillator being synchronized to the frequency of the carrier pilot signal to correct for frequency shifts suffered during the transmission over the transmission medium. A modulator is connected to the output of the first oscillator and to the output of a second oscillator to obtain a modulator output frequency which is the combination of the output frequencies of both oscillators such as the frequency $f_2$ of the transmitting terminal for lower single sideband demodulation. The combined frequency output of this modulator is then fed to the first demodulator which also has an input connected to receive the transmitted signal. The output of the first demodulator is fed to a second demodulator which is connected to the second oscillator to provide the final demodulation in the receiver. The connection of the modulator with the oscillator of the automatic phase control circuit, the second oscillator, and the first demodulator prevents the introduction of additional frequency offset in the receiver as discussed in detail hereinafter. Since the automatic phase control circuit need only recover the carrier pilot signal and correct for the frequency variations of only a single oscillator in the transmitter, the gain and capture range of this circuit may be substantially smaller than the gain and capture range required by the prior art circuits. The phase errors introduced by the automatic phase control circuits of the prior art are also reduced.

As discussed hereinafter, the present invention can be used with either upper or lower sideband, vestigial sideband, or double sideband modulation in the first stage of modulation in the transmitter and in the corresponding stage of demodulation in the receiver. In addition, the two steps of modulation and demodulation process described heretofore can be extended to n steps of modulation and demodulation without any increase in the frequency offset or phase error introduced by the additional steps of modulation.

BRIEF DESCRIPTION OF THE DRAWINGS

Other objects and features of the present invention will be apparent from the following discussion and drawings in which.

DETAILED DESCRIPTION

Figure 1:
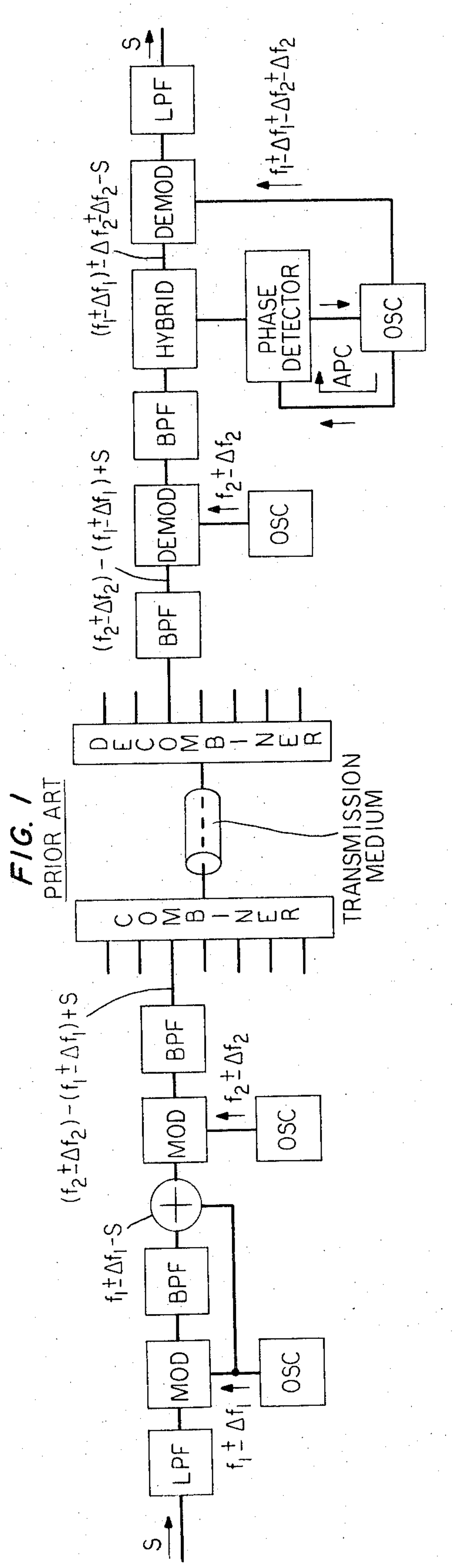
FIG. 1 PRIOR ART
FIG. 1 is a block diagram embodiment of a prior art system.
Figure 2:
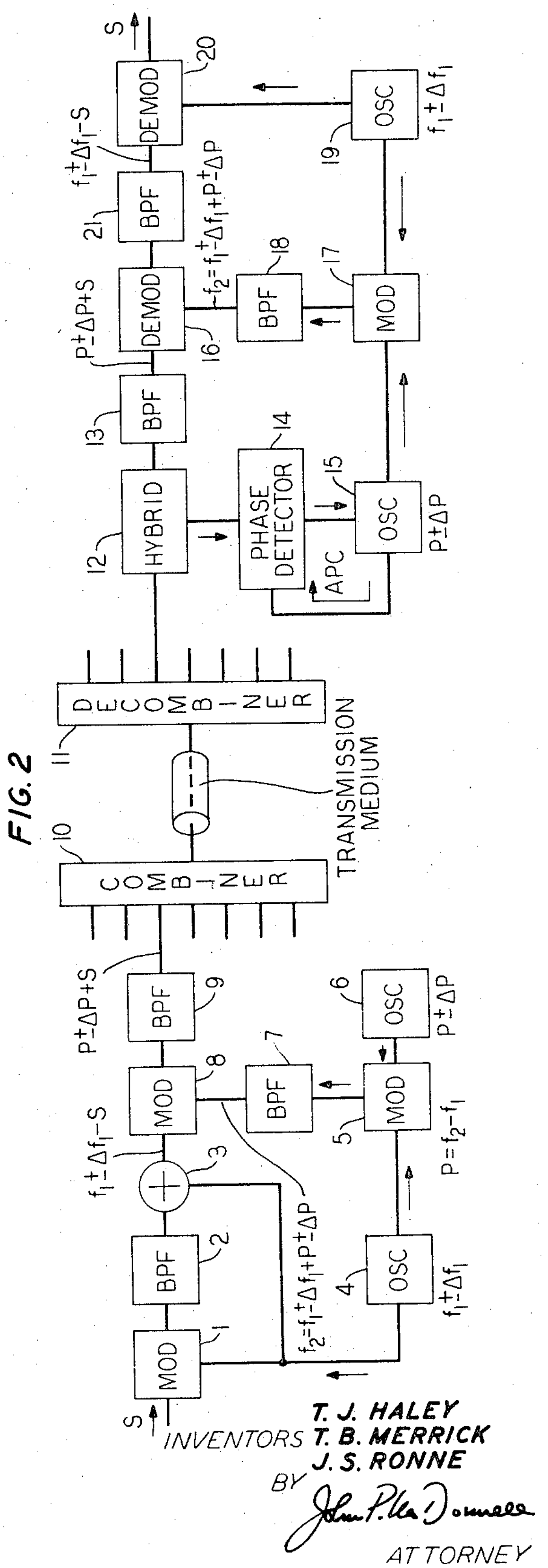
FIG. 2 is a block diagram embodiment of the present invention employing two steps of modulation and demodulation.

In the transmitting terminal of the transmission system illustrated in FIG. 2, the input signal S is fed into modulator 1 with the output of the modulator 1 being connected by a bandpass filter 2 to an input of the summing network 3. Oscillator 4, which has a frequency output $f_1$ with a frequency variation $\pm\Delta f_1$, is connected to the modulator 1, the modulator 5, and an input of the summing network 3. For purposes of illustration and comparison only, the frequency designations $f_1$ and $f_2$ and the lower single sideband modulator employed in connection with the prior art system of FIg. 1 have been retained in FIG. 2 with the nominal carrier pilot frequency in both systems being numerically equal to $f_2 - f_1$. The input signal S to the modulator 1 is thus modulated at the carrier frequency $f_1$ of the oscillator 4 and fed to an input of the summing network 3 where the frequency $f_1$ of the oscillator 4 is added to the modulated signal. Modulator 5 is also connected to the output of oscillator 4. Oscillator 6, which has a frequency output $p$ corresponding to the carrier pilot frequency and a frequency variation $\pm\Delta p$, is connected to the modulator 5. The output of the modulator 5 is fed through a bandpass filter 7 to the second and final modulator 8, the output of which is fed through bandpass filter 9 to a combiner network 10 where it is combined with other signals for transmission over a transmission medium schematically represented for illustrative purposes as a coaxial cable.

The decombiner network 11 at the receiving terminal of the transmission system illustrated in FIG. 2 decombines the received combination of signals into the individual channels transmitted by the transmitter, one of the transmitting channel circuits being shown in FIG. 2. The demodulating channel circuitry on the right of FIG. 2 corresponds to the transmitting channel circuitry on the left of FIG. 2 and has an input hybrid network 12 connected to receive the decombined signal. The hybrid network 12 has one output connected to a bandpass filter 13 and a second output connected to an automatic phase control network comprising a phase detector 14 and a voltage controlled oscillator 15. Phase detector 14 is connected to the hybrid network 12 and the oscillator 15, the latter connections forming an automatic phase control loop shown as APC in FIG. 2 of the drawing. The first demodulator 16 is connected to the output of the bandpass filter 13. The modulator 17 supplies the second input to the demodulator 16 through the bandpass filter 18. Modulator 17, in turn, has two inputs, one connected to an oscillator 19 and another to the oscillator 15 to receive a $p\pm\Delta p$ frequency input which has been recovered by the APC loop comprising phase detector 14 and oscillator 15. Although as shown in FIG. 2, oscillator 19 is illustrated as having an output frequency $f_1\pm\Delta f_1$ corresponding to the frequency of the oscillator 4 in the transmitting terminal, the frequency of the oscillator 19 may be other than the frequency $f_1$ of the oscillator 4, as discussed in detail hereinafter. (It should also be noted that although for ease of illustration the frequency variations of both oscillators 4 and 19 are designated as $\Delta f_1$, these variations would not necessarily be the same at any given point in time.) The output of oscillator 19 is also connected to one input of the second and final demodulator 20, while the other input of demodulator 20 is connected to the output of demodulator 16 by the bandpass filter 21. The output of the demodulator 20 is connected to the output of the receiver terminal.

The manner in which the circuitry of FIG. 2 reduces the frequency offset of the system to the $\pm\Delta p$ variation of the single oscillator 6 will now be discussed in detail. As noted heretofore, the input signal S, which may be analog or digital, to the transmitting terminal of FIG. 2 is initially modulated at a frequency $f_1$ generated by the oscillator 4 which has an output frequency variation designated as $\pm\Delta f_1$ in the drawing. The input signal S as thus modulated with frequency $f_1$ is fed through a bandpass filter 2 to remove the undesired frequencies obtained as byproducts in the modulation process. The selected frequency outputs of the bandpass filter 2 are then fed to the summing network 3 where they are combined with the output frequency $f_1$ of the oscillator 4 in the form of a low level pilot. The reason for the inclusion of the output signal from the oscillator 4 with the modulated signal will be apparent from the following discussion. The frequency of the output signal of the summing network 3 may be numerically expressed, as shown in the drawing, as $f_1\pm\Delta f_1-S$ for lower single sideband modulation, where S represents the frequencies of the input signal. The output frequency of the summing network 3 is fed into the second modulator 8 where it is now modulated by the frequency $f_2$ which, for lower single sideband modulation, is the sum of the frequencies $f_1$ and $p$, where the nominal carrier pilot frequency $p=f_2-f_1$, as also noted in the drawing.

Before discussing the function of the second modulator 8, it is useful to discuss the role played by the third modulator 5. The modulator 5 has one input connected to the oscillator 4 to receive the $f_1\pm\Delta f_1$ signal output of the oscillator 4, and a second input connected to the oscillator 6 to receive the $p\pm\Delta p$ output of the oscillator 6 where $\pm\Delta f_1$ and $\pm\Delta p$ represent the frequency variations of the oscillators 4 and 6, respectively. The output of the third modulator 5 is fed through a bandpass filter 7 where the undesired frequencies are removed with the frequency output of the bandpass filter 7 being numerically equal to $f_2=f_1\pm\Delta f_1+p\pm\Delta p$.

The inputs to the second modulator 8 are thus the $f_1\pm\Delta f_1-S$ output from the summing network 3 and the $f_2=f_1\pm\Delta f_1+p\pm\Delta p$ input from the modulator 5 and the bandpass filter 7. For the lower single sideband modulator example used in connection with all the figures in the application, these inputs numerically subtract in the modulator 8 such that the output of this modulator is $$(f_1\pm\Delta f_1+p\pm\Delta p)-(f_1\pm\Delta f_1-S)=p\pm\Delta p+S.$$

For comparison with the prior art system of FIG. 1, $$p\pm\Delta p+S=(f_2-f_1)\pm\Delta(f_2-f_1)+S.$$

Thus, for the 6.178 mHz carrier pilot of the prior art system of FIG. 1, the frequency output of oscillator 6 would be 6.178 mHz, while the frequency output of the oscillator 4 might be any compatible value such as, for example, the 5.622 mHz frequency $f_1$ of the prior art system. The frequency offset of the transmitted signal in the present invention is therefore only the $\pm\Delta p$ variation of the single oscillator 6 and does not include the $\pm\Delta f_1$ frequency variation of the oscillator 4. A major advantage of the present invention over the prior art system illustrated in FIG. 1 may be clearly seen by recalling that the output frequency of the transmitter of the prior art system is $$(f_2\pm\Delta f_2)-(f_1\pm\Delta f_1)+S \text{ or}$$

$$(f_2-f_1)+(\pm\Delta f_2\mp\Delta f_1)+S.$$

The maximum transmitted frequency offset will thus be $+\Delta f_2+\Delta f_1$ or $-\Delta f_2-\Delta f_1$, where the frequency variations of the individual oscillators add. In the FIG. 2 system of the present invention, however, the maximum transmitted frequency offset will be $\Delta p$ or $\Delta(f_2-f_1)$, the frequency variation of a single oscillator. With the present invention, therefore, the frequency offset of a frequency division multiplexed transmission system may be reduced to a level compatible with the requirements of modern wideband transmission systems.

In the transmission system of FIG. 2, the output of each of the modulators is fed into a combiner network 10 for transmission over a transmission medium such as a coaxial cable to a compatible demodulator at a designated receiving terminal. As shown in FIG. 2 of the drawing, the demodulating circuitry comprises a decombiner network 11 which separates the received combined signal into the prescribed channels. The demodulating circuitry on the right in FIG. 2 corresponds to the modulating circuitry on the left of FIg. 2. The output of the decombiner 11 is fed to a hybrid network 12, the outputs of which feed a portion of the received signal to the bandpass filter 13 and a portion to the carrier recovery circuit comprising an automatic phase control loop formed with interconnection between phase detector 14 and oscillator 15. At this point a significant difference between the demodulating circuitry of the FIG. 1 prior art system and the FIG. 2 system of the present invention should be noted. Whereas the FIG. 1 system necessarily connected the automatic phase control circuitry to the final stage of the demodulation in an attempt to provide maximum compensation for the frequency and phase offset due to the variations of the two oscillators in the transmitting terminal and the oscillator connected to the first stage of demodulation in the demodulator terminal, the automatic phase control loop in the present invention is required only to recover the pilot carrier frequency and correct for the phase and/or frequency error incurred during transmission. The automatic phase control loop may thus be connected at the input of the demodulator circuitry and need not be designed to meet the stringent requirements imposed on the automatic phase control circuits of the prior art, as discussed heretofore in connection with FIg. 1.

One output of the hybrid 12 is fed through the bandpass filter 13, where undesired frequency components incurred in transmission are removed, to one input of the first demodulator 16. The corrected output frequency of oscillator 15 of the automatic phase control loop is fed to one input of modulator 17. As in the case of oscillator 6 in FIG. 1, the oscillator 15 is illustrated in FIg. 2 as having an output frequency $p$ and a frequency variation $\pm\Delta p$ conforming in frequency to the carrier pilot. The second input to the modulator 17 is from the oscillator 19 which, as in the case of oscillator 4 in the transmitting terminal, is illustrated as having an output frequency $f_1$ and a frequency variation $\pm\Delta f_1$. The output of the modulator 17 is thus the frequency $f_2 = f_1 \pm \Delta f_1 + p \pm \Delta p$. The output of modulator 17 is fed through bandpass filter 18 to eliminate the undesired frequencies and fed to one input of demodulator 16. The output of demodulator 16 eliminates the frequency variation, $\Delta p$, of the carrier pilot frequency p. Since bandpass filter 21 eliminates undesired frequencies incurred in the demodulation 16, the frequency output of this filter is numerically equal to $f_1 \pm \Delta f_1 - S$ and is fed to an input to the second demodulator 20. Thus this signal has a frequency variation, $\pm\Delta f_1$, due to oscillator 19. Oscillator 19 supplies the frequency $f_1 \pm \Delta f_1$ to the second and final demodulator 20 such that the output of demodulator 20 eliminates the frequency variation and the signal $S$ input to the transmitting circuitry is recovered at the output of the demodulator 20. Thus there is no additional frequency offset due to the variations of either oscillator 15 or 19 introduced in the receiver. FIG. 2 illustrates a complete modulator and demodulator system. It should be noted that the nominal carrier pilot frequency in both the prior art system of FIg. 1 and in the system of FIG. 2 embodying the present invention is $(f_2 - f_1)$.

Although the oscillator 19 in the receiving terminal of FIG. 2 was chosen for illustrative purposes to have the same frequency as oscillator 4 in the transmitting terminal, the frequency of this oscillator need not in fact be equal to the frequency of the oscillator in the transmitting terminal since the structure of the present invention is such that the phase error in the demodulated signal, $S$, and the phase error in the automatic phase control circuit are not in any way affected by the choice of frequencies or the frequency stability of these oscillators. The output of the oscillator 19 is thus fed to the modulator 17, where it is combined with the output of oscillator 15, and applied to the demodulator 16. The frequency $f_1$ of the oscillator 19 is thereby in effect inserted at the output of demodulator 16 and then eliminated at the output of the second stage of demodulation 20 to which oscillator 19 is also connected to prevent the addition of frequency offset in the receiver terminal due to the frequency variations of the oscillator 19. The inherent operation of the automatic phase control loop eliminates the frequency variations of the oscillator 15. The oscillators employed in the present invention therefore need not have the high degree of accuracy required by the oscillators of the prior art system, hence, may be relatively inexpensive and less complex. Moreover, since the automatic phase control circuit need only correct for frequency and phase errors in the carrier pilot, the large loop gain and capture range of the automatic phase control loop of the prior art system may also be reduced. It should also be noted that the phase error in the automatic phase control circuit is independent of the frequency stability of oscillators 4 and 19, hence the stability of these oscillators need only be sufficient to maintain the signal within the proper passband portion of the bandpass and band shaping network. For the transmission of signals where the frequency and phase shift incurred during transmission over the transmission medium can be tolerated and yet it is desired to reduce the frequency offset due to output frequency variations of the oscillators to levels lower than those incurred with prior art systems, hybrid 12 and phase detector 14 may be eliminated with oscillator 15 connected directly to modulator 17. Such an arrangement might be used, for example, for analog transmission. In such an arrangement, a pilot signal would not be required.

Figure 3:
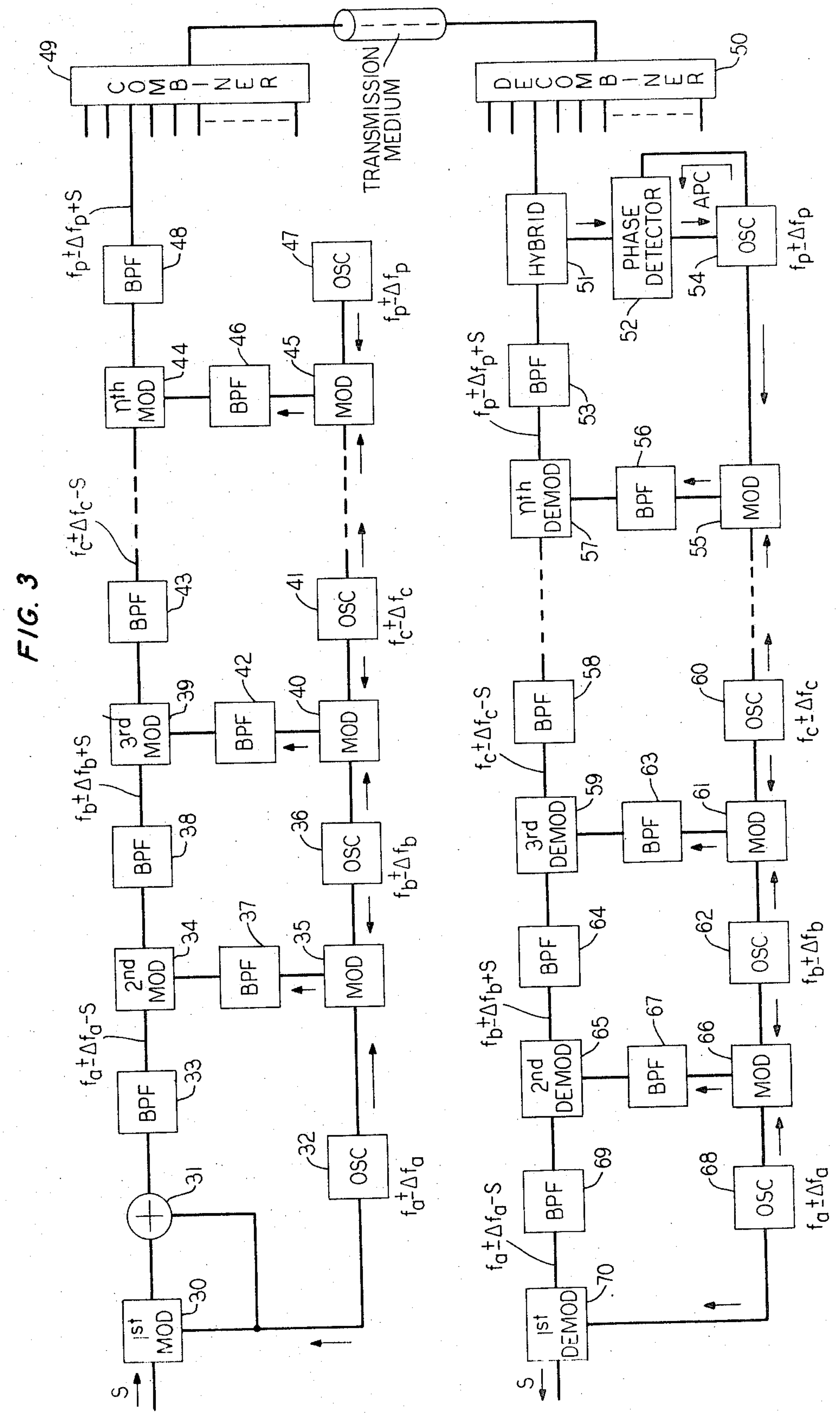
FIG. 3 is a block diagram embodiment of the present invention employing *n* steps of modulation and demodulation.

The carrier supply of the present invention as illustrated in FIG. 2 can be used with either upper or lower sideband, vestigial sideband, or double sideband modulation in the first modulator 1 and corresponding demodulator 20. If the second modulator 8 is lower single sideband, the nominal carrier frequency for the modulator 5 must be numerically equal to $f_1 + p$, as illustrated in FIG. 2, while for the upper single sideband the nominal carrier frequency would be numerically equal to $p - f_1$. In other words, if modulator 8 is lower single sideband then modulator 5 would be upper single sideband and conversely if modulator 8 is upper single sideband then modulator 5 would be lower single sideband. In addition, the two steps of modulation shown in FIG. 2 can be extended to $n$ steps as illustrated in the system of FIG. 3. In the $n$ steps of modulation system of FIG. 3, the resulting frequency offset of the carrier pilot and hence the phase error in the automatic phase control circuit and the phase error in the demodulated signal, $S$, are no greater than that for the two steps of modulation of the system of FIG. 2.

In the system of FIG. 3, the input signal S is applied to a first modulator 30, the output of which is connected to one input of the summing network 31. The second input of the summing network 31 is connected to the output of the oscillator 32. Oscillator 32 is also connected to the first modulator 30 to modulate the input signal $S$ at the frequency $f_a$. To be consistent with the frequency notations of FIGS. 1 and 2, the notations of FIG. 3 are for lower single sideband modulation. The output frequency of summing network 31 is fed through bandpass filter 33 to the input to the second modulator 34. (If desired, the summing network 31 could also be connected between the bandpass filter 33 and the modulator 34 in the manner shown in FIG. 2.) Modulator 35 has one input connected to oscillator 32 and a second input connected to oscillator 36. The output frequency of modulator 35 is connected by bandpass filter 37 to the second input of the second modulator 34. If the frequency of oscillator 32 is assumed to be $f_a$ and the variation $\pm\Delta f_a$, the frequency of the output signal passed by the bandpass filter 33 to one input of the second modulator 34 will be $f_a \pm \Delta f_a - S$ for lower single sideband modulation in the manner discussed in connection with the circuit of FIG. 2. If the oscillator 36 is assumed to have an output frequency $f_b$ and a variation $\pm\Delta f_b$, then the output frequency of the modulator 35 passed by bandpass filter 37 to the second input of the second modulator 34 will be $f_a \pm \Delta f_a + f_b \pm \Delta f_b$. The output frequency of the second modulator 34 passed by bandpass filter 38 to one input of the third modulator 39 will then be numerically equal to $f_b \pm \Delta f_b - S$ for lower single sideband modulation in the manner discussed in connection with FIG. 2.

One input to modulator 40 is connected to oscillator 36, while the second input is connected to oscillator 41 which has an output frequency $f_c$ and a variation $\pm\Delta f_c$. The output frequency from the modulator 40 passed through the bandpass filter 42 to the second input of the third modulator 39 will be $f_b \pm \Delta f_b + f_c \pm \Delta f_c$. The output frequency of the third modulator 39 passed through bandpass filter 43 to the next or fourth modulator would be numerically equal to $f_c \pm \Delta f_c - S$ for lower single sideband modulation and so on to the $n^{th}$ modulator. The output of the modulator 45 would, as in the previous stages, be passed through a bandpass filter 46 to one input of the $n^{th}$ modulator 44. The other input to the $n^{th}$ modulator 44 would be from the output of the $n-1$ modulator. Oscillator 47, having an output frequency $f_p$ and a frequency variation $\pm\Delta f_p$, would be connected to the modulator 45. The $n-1$ oscillator would also be connected to the modulator 45. The desired output frequency of the $n^{th}$ modulator 44 passed through bandpass filter 48 to the combiner network 49 would be numerically equal to $f_p \pm \Delta f_p + S$ for lower single sideband modulation. As discussed in connection with FIG. 2, the combiner network 49 combines each of the mastergroup channels for transmission over a medium such as a coaxial cable.

In summary, the first, second, third, up to the $n^{th}$ modulators may be thought of as connected with the summing network 31 and the bandpass filters in a series string between the input and output terminals of the transmitting terminal. The second group of modulators 35, 40, 45, are interconnected between individual oscillators with each of modulators 35, 40, and 45 being connected to an individual one of the first group of modulators 34, 39, and 44, respectively, by a bandpass filter.

At the receiving terminal of the transmission system illustrated in FIG. 3, a decombiner circuit 50 separates the combined transmitted signal into individual channels corresponding to those of the transmitting terminal. At the receiver of the lower portion of the system of FIG. 3, the channel corresponding to the channel transmitted from the transmitter at the top of FIG. 3 is fed into a hybrid network 51 with a portion of the incoming signal fed to the phase detector 52 and a portion to the bandpass filter 53. Phase detector 52 and oscillator 54 are interconnected to form an automatic phase control loop to recover the carrier pilot frequency and phase, as discussed in connection with the system of FIG. 2. As also discussed in connection with FIG. 2, the inherent operation of the automatic phase control loop eliminates the frequency variations of the oscillator 54. As noted in the drawing, the oscillator 54 has a nominal frequency output $f_p$ and is connected with phase detector 52 to an input to modulator 55 which also has an input connected to another immediately adjacent oscillator in a chain of $n$ stages. The combined frequency output of modulator 55 is passed through bandpass filter 56 to the lower single sideband $n^{th}$ demodulator 57. The output of the $n^{th}$ demodulator 57 is fed to the next immediately adjacent demodulator section in the illustrated chain. In FIG. 3, the frequency appearing at the input of the lower single sideband third demodulator 59 connected to the output of bandpass filter 58 would thus be $f_c \pm \Delta f_c - S$, in the manner discussed in connection with FIG. 2.

Oscillator 60, which has a frequency output $f_c$ and a frequency variation $\pm\Delta f_c$, is connected to one input of a modulator 61 with the other input of modulator 61 connected to oscillator 62, which has an output frequency $f_b$ and a frequency variation $\pm\Delta f_b$. The output of the modulator 61 is fed through bandpass filter 63 to an input of the third demodulator 59. The output of the lower single sideband third demodulator 59, $f_b \pm \Delta f_b + S$, is fed through bandpass filter 64 to one input of the lower single sideband second demodulator 65. The other input to the second demodulator 65 is connected to the output of modulator 66 by the bandpass filter 67. Oscillator 62 is connected to one input of modulator 66, and oscillator 68, which has a frequency output $f_a \pm \Delta f_a$, is connected to the other input of modulator 66. The output of the second demodulator has passed by bandpass filter 69 connected to the input of the first demodulator 70 and is thus numerically equal to $f_a \pm \Delta f_a - S$. Oscillator 68 is also connected to the lower single sideband first demodulator 70, hence the output frequency of the first demodulator is S, the signal applied to the input of the transmitting terminal.

In summary, the first, second, third, up to the $n^{th}$ modulators may be thought of as connected with the bandpass filters in a series string between the input and output terminals of the demodulating terminal. The oscillators 54, 60, 62, and 68 are connected in pairs with each of the modulators 55, 61, and 66 also in a series string with the first oscillator 54 in the string being connected to the carrier recovery circuit and the last oscillator 68 in the string connected directly with the first demodulator 70. Each of the modulators is connected to an individual one of the demodulators by individual bandpass filters.

The operation of the system of FIG. 3 having $n$ steps of modulation and demodulation is functionally similar to the system of FIG. 2, which employs only two steps of modulation, hence is not discussed further at this time. It should be noted that the resulting frequency offset of the carrier pilot and hence the phase error in the automatic phase control circuit and in the demodulated signal, $S$, is no greater for the two steps of modulation of the system of FIg. 2 than for the $n$ steps of the system of FIG. 3. In addition, since the phase error in the automatic phase control circuit is independent of the frequency stability of all oscillators except oscillator 47 in the transmitter and all oscillators except oscillator 54 in the receiver. Except for oscillators 47 and 54, therefore, the oscillators of FIg. 3 need only be sufficiently stable to maintain the signal within the proper passband portion of the bandpass and band shaping networks, hence may be relatively simple and inexpensive. As in the system of FIG. 2, the automatic phase control circuits need only detect and recover the pilot frequency and therefore do not require the large loop gain and capture range or exhibit the large phase error of the prior art systems. As in the system of FIG. 2, except for the pilot frequency $f_p$, the frequencies of the respective oscillators in the transmitting and receiving terminals need not be equal, e.g., frequency $f_a$ of oscillator 32 need not equal frequency $f_a$ of oscillator 68, the frequency $f_b$ of oscillator 36 need not equal the frequency $f_b$ of oscillator 62, and so on, since the automatic phase control circuit of the present invention is not influenced by any frequency of the transmitter and receiver other than $f_p$. It should be additionally noted that the present invention could be employed in various stages of a frequency division multiplexed system as, for example, in either the supergroup or mastergroup stages for either digital or analog input signals. As noted heretofore in connection with the receiving terminal of FIG. 2, hybrid 51 and phase detector 52 of FIG. 3 may be eliminated for applications where the frequency and phase shift incurred during transmission can be tolerated and yet it is desired to reduce the frequency offset to relatively low levels. In such an arrangement, a pilot signal would not be required.

The above-described arrangement is illustrative of the application of the principles of the invention. Other embodiments may be devised by those skilled in the art without departing from the spirit and scope thereof.

What is claimed is:

1. A transmitter for a frequency division multiplexed system having $n$ steps of modulation to produce an output signal which includes a modulated input signal comprising a first plurality of $n$ modulators having their respective first input and output connected in a series string between the input and output of said transmitter, a plurality of $n$ oscillators each having individual output frequencies, a second plurality of $n-1$ modulators having their respective first and second inputs connected to individual pairs of adjacent oscillators of said plurality of $n$ oscillators to form a series string of alternate oscillators and modulators beginning with a first oscillator and ending with a last oscillator of said plurality of $n$ oscillators, means connecting said first oscillator of said plurality of $n$ oscillators to the second input of said first modulator of said first plurality of modulators connected to the input terminal of said transmitter, means for combining the output of said first oscillator of said plurality of oscillators with the output of the modulator of said first plurality of modulators connected to the input of said transmitter, and means connecting the output of each of said second plurality of modulators with the second input of each of said first plurality of modulators except the one connected to the input of said transmitter, the output frequency of each of said second plurality of modulators being a combination of the frequencies of the oscillators connected thereto, whereby the frequency offset in the transmitted signal is due only to the frequency variation of the said last oscillator of said plurality of $n$ oscillators.

2. A transmitter for a frequency division multiplexed system in accordance with claim 1 wherein each of said first plurality of modulators is lower single sideband and the output signal of each of said second plurality of $n-1$ modulators is at a frequency which is the sum of the frequencies of the oscillators connected thereto.

3. A transmitter for a frequency division multiplexed system in accordance with claim 1 wherein each of said first plurality of modulators is upper single sideband and the output signal of each of said second plurality of $n-1$ modulators is at a frequency which is the difference of the frequencies of the oscillators connected thereto.

4. A receiver in a frequency division multiplexed transmission system for demodulating an input signal modulated $n$ times comprising a plurality of $n$ demodulators having their respective first input and output coupled in a series string between the input and output of said receiver, a plurality of $n$ oscillators having individual output frequencies, a plurality of $n-1$ modulators having their respective first and second inputs connected to individual pairs of adjacent oscillators of said plurality of $n$ oscillators to form a series string of alternate oscillators and modulators beginning with a first oscillator and ending with a last oscillator of said plurality of $n$ oscillators, the last of said plurality of $n$ oscillators in said series string being connected directly to the first input of the demodulator of said $n$ demodulators connected to the output of said receiver, and means connecting the outputs of individual ones of each of said plurality of $n-1$ modulators to the second input of individual ones of each of said plurality of $n$ demodulators except the demodulator connected to the output of said receiver.

5. A receiver for a frequency division multiplexed transmission system in accordance with claim 4 wherein each of said $n$ demodulators is lower single sideband and the signal at the said output of each of said plurality of $n-1$ modulators is at a frequency which is the sum of the frequencies of the pair of oscillators connected thereto.

6. A receiver for a frequency division multiplexed transmission system in accordance with claim 4 wherein each of said $n$ demodulators is upper single sideband and the signal at the said output of each of said plurality of $n-1$ modulators is at a frequency which is the difference of the frequencies of the pair of oscillators connected thereto.

7. A receiver for a frequency division multiplexed transmission system in accordance with claim 4 wherein a carrier pilot signal is transmitted with said input signal modulated $n$ times and a carrier recovery circuit including the first of said plurality of $n$ oscillators in said string is connected to the input of said receiver, said first oscillator of said plurality of $n$ oscillators having an output frequency substantially that of the received carrier pilot signal to correct for the frequency variations suffered during transmission over the transmission medium.

8. A receiver in accordance with claim 7 wherein said carrier recovery circuit additionally includes a phase detector coupled to said input of said receiver and means connecting said phase detector with said first oscillator of said carrier recovery circuit in an automatic phase control loop.

9. A transmitter for a frequency division multiplexed system comprising a first modulator having a first input connected to the input of said transmitter, a summing network having a first input connected to the output of said first modulator, a second modulator having a first input connected to the output of said summing network, the output of said second modulator being connected to the output of said transmitter, a first oscillator and a second oscillator, means connecting the output of said first oscillator to the second input of said first modulator and the second input of said summing network, the frequency offset accumulated in said transmitter in the signal at the output of said first modulator being due only to the frequency variations of said first oscillator, a third modulator having a first input connected to the output of said first oscillator to receive only the output frequency and variations thereof of said first oscillator at said first input and a second input connected to the output of said second oscillator to receive only the output frequency and variations thereof of said second oscillator at said second input, the signal appearing at the output of said third modulator including only the output frequencies and accumulated frequency offsets of said first and second oscillators, and means connecting said output of said third modulator to the second input of said second modulator so that the accumulated frequency offset in the output signal of said second modulator and said transmitter is due only to the frequency offset of said second oscillator.

10. A receiver in a frequency division multiplexed system for demodulating a modulated input signal comprising an input terminal, a first demodulator having a first input connected to said receiver input terminal, a second demodulator having a first input connected to the output of said first demodulator and an output connected to the output of said receiver, a first oscillator and a second oscillator, a modulator having a first input connected to the output of said first oscillator to receive only the output frequency and variations thereof of said first oscillator at said first input and a second input connected to said second oscillator to receive only the output frequency and variations thereof of said second oscillator at said second input, the signal appearing at the output of said first modulator including only the output frequencies and accumulated frequency offsets of said first and second oscillators, means connecting the output of said first modulator to the second input of said first demodulator, and means connecting the output frequency and variations thereof at the output of said second oscillator to the second input of said second demodulator, whereby the frequency offset introduced by said first and second oscillators in said receiver is minimized.

11. A receiver for a frequency division multiplexed transmission system in accordance with claim 10 wherein a carrier pilot signal is transmitted with said modulated input signal and a carrier recovery circuit including said first oscillator is connected to the input to said receiver, said first oscillator having an output frequency substantially that of the received carrier pilot signal to correct for the frequency variations suffered during transmission over the transmission medium.

12. A receiver in accordance with claim 11 wherein said carrier recovery circuit additionally includes a phase detector connected to said input of said receiver and means connecting said first oscillator to said phase detector to form an automatic phase control loop.

* * * * *

UNITED STATES PATENT OFFICE
CERTIFICATE OF CORRECTION

Patent No. 3,733,438 Dated May 15, 1973

Inventor(s) Thomas J. Haley, Thomas B. Merrick, and James S. Ronne

It is certified that error appears in the above-identified patent and that said Letters Patent are hereby corrected as shown below:

Title page - The attorney named "E. W. Jr. should be corrected to read --E. W. Adams, Jr.--.

Column 7, line 49, the word "demodulation" should be corrected to read --demodulator--.

Column 12, line 34, before "input", the word "first" should be corrected to read --second--.

Signed and sealed this 9th day of April 1974.

(SEAL)
Attest:

EDWARD M.FLETCHER,JR.
Attesting Officer

C. MARSHALL DANN
Commissioner of Patents